(12) United States Patent
Wilson

(10) Patent No.: US 6,866,457 B2
(45) Date of Patent: Mar. 15, 2005

(54) DECORATIVE CAPPED WHEEL NUT OR BOLT ASSEMBLY AND METHOD

(75) Inventor: Larry J. Wilson, Commerce Township, MI (US)

(73) Assignee: Industrial and Automotive Fasteners, L.L.C., Royal Oak, MI (US)

(*) Notice: Subject to any disclaimer, the term of this patent is extended or adjusted under 35 U.S.C. 154(b) by 0 days.

(21) Appl. No.: 10/303,564

(22) Filed: Nov. 25, 2002

(65) Prior Publication Data

US 2003/0068212 A1 Apr. 10, 2003

Related U.S. Application Data

(63) Continuation-in-part of application No. 09/828,662, filed on Apr. 5, 2001, now abandoned.

(51) Int. Cl.[7] ............................................. F16B 37/14
(52) U.S. Cl. ............................................. 411/431; 411/373
(58) Field of Search ........................... 411/372.5–377, 411/429–431

(56) References Cited

U.S. PATENT DOCUMENTS

| | | | |
|---|---|---|---|
| 154,255 A | | 8/1874 | Ives |
| 1,834,871 A | * | 12/1931 | Heyman ..................... 411/377 |
| 2,018,301 A | | 10/1935 | Ferry |
| 2,391,989 A | | 1/1946 | Luce |
| 3,364,806 A | | 1/1968 | Chaivra |
| 3,585,900 A | * | 6/1971 | Chaivre ..................... 411/430 |
| 3,955,231 A | | 5/1976 | Erdmann |
| 4,015,503 A | | 4/1977 | Romano |
| 4,018,133 A | | 4/1977 | Chaivre et al. |
| 4,056,862 A | | 11/1977 | Chaivre et al. |
| 4,123,961 A | | 11/1978 | Chaivre et al. |
| 4,143,578 A | | 3/1979 | Becker |
| 4,275,285 A | | 6/1981 | Jadach |
| 4,472,095 A | | 9/1984 | Molina |
| 4,669,937 A | | 6/1987 | Feldman |
| 4,764,070 A | * | 8/1988 | Baltzell et al. ............. 411/430 |
| 4,775,272 A | | 10/1988 | Toth |
| 4,955,773 A | | 9/1990 | Toth |
| 5,180,266 A | | 1/1993 | Nolan et al. |
| 5,302,069 A | * | 4/1994 | Toth et al. .................... 411/429 |
| 5,857,818 A | * | 1/1999 | Bias, Sr. ...................... 411/431 |
| 6,305,627 B1 | * | 10/2001 | Stiner et al. ................. 242/283 |

FOREIGN PATENT DOCUMENTS

| | | |
|---|---|---|
| DE | 41 05 741 A1 | 9/1992 |
| DE | 44 39 567 A1 | 6/1995 |
| FR | 1261528 | 6/1960 |
| FR | 1261528 | 4/1961 |
| GB | 739405 | 10/1955 |
| GB | 2 176 859 A | 1/1987 |
| GB | 2176859 A | 1/1987 |

* cited by examiner

*Primary Examiner*—Flemming Saether
(74) *Attorney, Agent, or Firm*—Brinks Hofer Gilson & Lione

(57) ABSTRACT

A decorative cap and wheel nut or bolt insert assembly, and a method of assembling them. The insert is coated and/or plated and includes a hex-shaped section and a section having a circular cylindrical outer surface. A cap includes a hex cross-section segment and a circular cylindrical cross-section segment. The hex cross-section segment of the cap slips easily over the hex section of the insert while the circular cylindrical cross-section segment has a smaller ID than the OD of the circular cylindrical insert section. The cap is formed of sheet material which is both plastically and elastically deformable. When pressed onto the insert, the cap deforms both plastically and elastically. An interference fit is formed between them by radial plastic deformation of the cap.

15 Claims, 4 Drawing Sheets

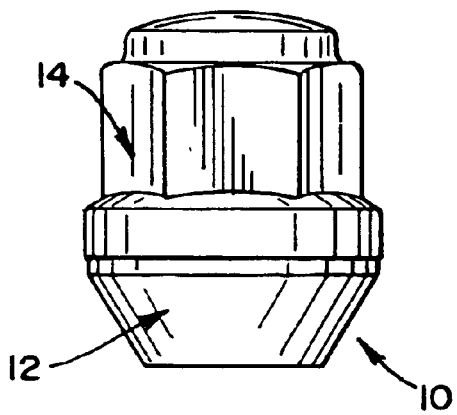
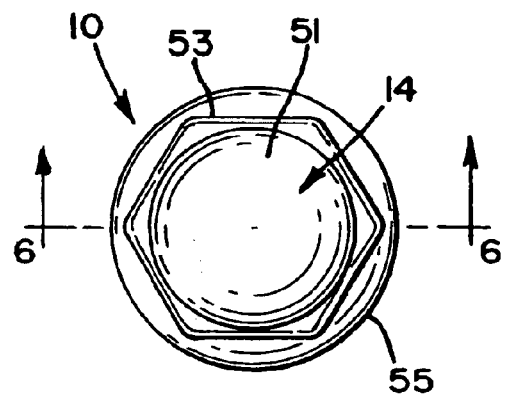
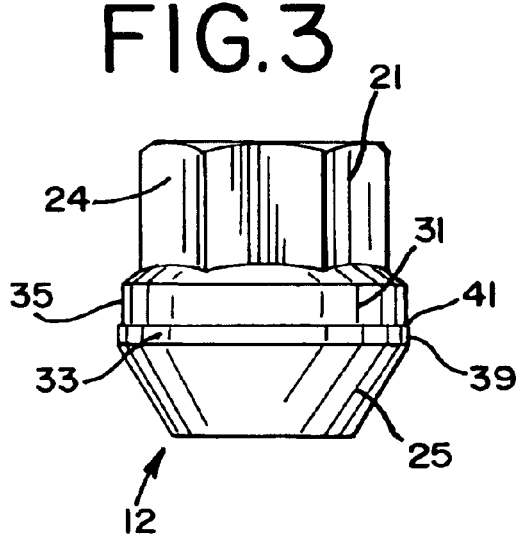
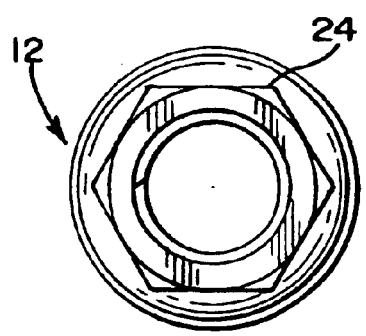
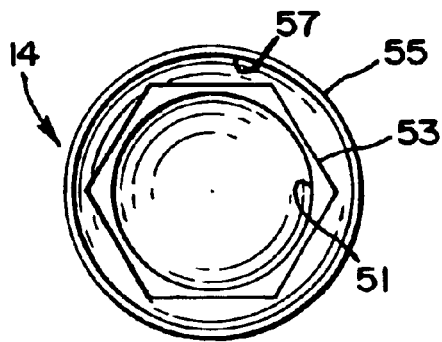
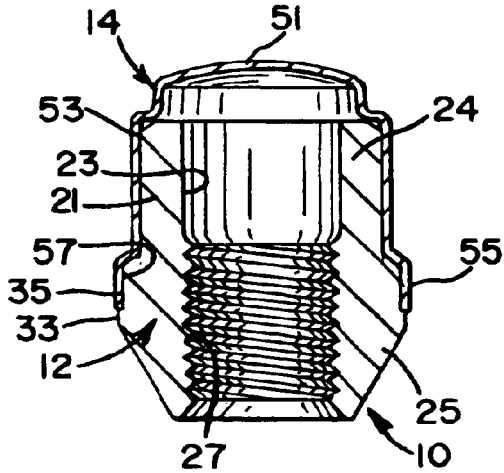

DECORATIVE CAPPED WHEEL NUT OR BOLT ASSEMBLY AND METHOD

RELATED APPLICATION

This application is a continuation-in-part of application Ser. No. 09/828,662, filed Apr. 5, 2001, now abandoned.

FIELD OF THE INVENTION

This invention relates generally to wheel nuts or bolts for securing a vehicle wheel, i.e., a tire and rim, on a motor vehicle. It relates particularly to a decorative capped wheel nut or bolt assembly and assembly method.

BACKGROUND OF THE INVENTION

Decorative capped wheel nuts and bolts are well-known in the automotive art. A decorative capped wheel nut assembly, for example, conventionally comprises a nut insert and a decorative cap which is fastened to the insert by welding, crimping or with an adhesive. Examples of these constructions are illustrated in various prior art patents, including the Toth U.S. Pat. No. 4,955,773, the Bydalek U.S. Pat. No. 5,772,377, the Chaivre U.S. Pat. Nos. 4,018,133, and 4,056,862, the Baltzell U.S. Pat. No. 4,764,070 and the Somers et al. U.S. Pat. No. 6,036,420, for example. It is also known to form threads in a cap and in a lug nut and thread the cap onto the nut. See the Nolan et al. U.S. Pat. No. 5,180,266 in this regard.

All nut or bolt and cap assemblies described in the prior art require relatively complex fastening structures, assembly procedures and/or additional components. Assemblies made by welding require expensive and sophisticated equipment for implementation of production. Practical options for plating the inserts are limited where welding is employed, placing welded designs at a disadvantage for achieving high corrosion resistance. Crimped fastening designs require the addition of components, i.e., a sealant or O-ring, which complicates automated assembly. The use of adhesives for fastening causes similar problems. Because of the nature of welding, or the use of additional components, production rates for these assemblies processes are low.

SUMMARY OF THE INVENTION

An object of the invention is to provide an improved decorative capped wheel nut or wheel bolt assembly.

Another object is to provide a decorative capped wheel nut or wheel bolt assembly wherein the decorative cap is secured to the nut or bolt insert without welding, applying an adhesive, or using a sealant or O-ring.

Yet another object is to provide a decorative cap and insert assembly which is simpler and less expensive, but just as reliable, as prior art assemblies.

Still another object is to provide a new and improved method of assembling a decorative cap and nut or bolt insert.

The foregoing and other objects are realized in an insert and cap assembly wherein the components are securely fastened together by creating an interference fit between the cap and the insert. Specifically, the insert includes at least one section with a plated, coated or plated and coated circular cylindrical outer surface. The cap has a corresponding segment with a circular cylindrical inner surface which has an inside diameter 0.010 to 0.030 inches smaller than the outside diameter of the coated circular cylindrical outer surface. The cap is fabricated of material which makes it radially deformable both plastically and elastically. The insert is press fit into the cap, driving the cap's cylindrical inner surface over the insert's coated circular cylindrical outer surface. Radial plastic and elastic deformation of the cap occurs. A 0.002 to 0.006 inches interference fit is formed around the interfering circular cylindrical surfaces by the elastic deformation of the cap.

In most applications of the invention, a straight cylindrical interference fit is sufficient to retain the cap on the nut insert permanently. In another aspect of the invention the cap rim may also be crimped, however. In yet another aspect, the cap rim may be thickened and snap behind a shoulder on the insert.

The improved method of retaining a cap on the insert body requires only two components, the cap and the insert, thus reducing the extra expense of an additional component and the complexities of introducing this extra component into the assembly process. It also allows the use of all types of coating, plating and coating or plating alone on the insert, which is not possible using current welding assembly methods. Further cost savings may be achieved with higher assembly rates using simple hydraulic, pneumatic, or mechanical press equipment.

BRIEF DESCRIPTION OF THE DRAWINGS

The invention, including its construction and method of operation, is illustrated more or less diagrammatically in the drawings, in which:

FIG. 1 is a side elevational view of a first embodiment of the invention in a decorative capped wheel nut assembly;

FIG. 2 is a top plan view of the wheel nut assembly seen in FIG. 1;

FIG. 3 is a side elevational view of the nut insert for the decorative capped wheel nut assembly seen in FIGS. 1 and 2;

FIG. 4 is a top plan view of the nut insert seen in FIG. 3;

FIG. 5 is a bottom plan view of the cap for the decorative capped wheel nut assembly seen in FIGS. 1 and 2;

FIG. 6 is a sectional view taken along line 6—6 of FIG. 2;

DESCRIPTION OF THE PREFERRED EMBODIMENTS

Figure 7:
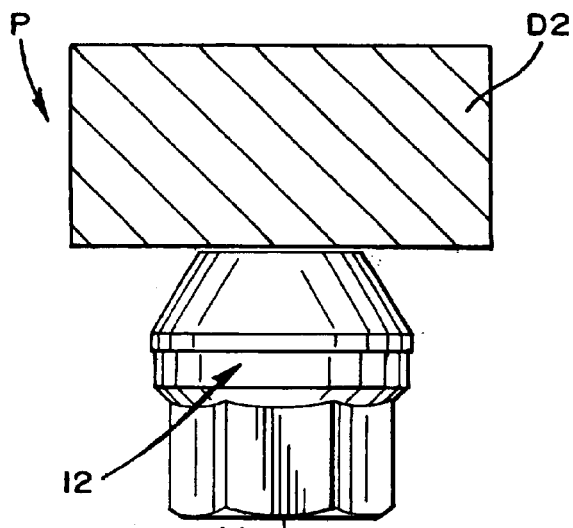
FIG. 7 is a diagrammatic illustration of an insert being press fit into a cap in a mechanical press.

Referring now to the drawings, and particularly to FIGS. 1–6, a decorative capped wheel nut assembly comprising a first embodiment of the present invention is seen generally at 10. The wheel nut assembly 10 includes a nut insert 12 and a decorative cap 14 fastened securely together by a method embodying features of the invention.

FIGS. 1, 2 and 6 illustrate the wheel nut 10 assembly, i.e., an assembled nut insert 12 and cap 14. FIGS. 3 and 4 illustrate a nut insert 12 separately. FIG. 5 illustrates a cap 14 separately (end view).

As seen in FIGS. 3, 4 and 6, the nut insert 12 comprises a body 21 having a cylindrical bore 23 extending axially through it from a hex-shaped section 24 on one end to a frusto-conical base 25 on the other. The nut insert 12 is commonly referred to as a hex-nut insert and is fabricated in a conventional manner of carbon steel. The frusto-conical base 25 is adapted to seat in a conventional manner in a wheel rim aperture (not shown) to fasten the wheel rim to a vehicle wheel stud (not shown). The bore 23 is internally threaded at its inner end 27 to receive the stud.

The nut insert 12 is coated in a conventional manner to prevent oxidation of exposed areas. In the embodiment illustrated a coating of GEOMET brand coating material available from Metal Coatings International, Inc. of Chardon, Ohio, is applied. GEOMET is a coating comprised mainly of overlapping zinc and aluminum flake in an inorganic binder, and is chromium free. It is applied over the entire insert 12 to a thickness of 0.001 inches.

Between the hex-shaped section 24 and the frusto-conical base 25, the insert body 21 has two cylindrical body sections 31 and 33. The section 31 of the illustrated insert body 21 has a cylindrical outer (coated) surface 35 with an outside diameter (OD) of 0.930 inches. The surface 35 has an axial length of 0.130 inches. The section 33 has a cylindrical outer (coated) surface 39 with an OD of 0.955 inches. The surface 33 has an axial length of 0.0625 inches. A radially extending shoulder 41 is formed between the two cylindrical surfaces 31 and 33.

As seen in FIGS. 2, 5 and 6, the cap 14 comprises three axially aligned wall segments; a dome-shaped end wall segment 51, a hex cross-section side wall segment 53 and a circular cylindrical side wall segment 55. The configuration and internal cross-sectional dimensions of the hex-shaped side wall segment 53 are such that it slips easily over the coated, hex-shaped section 24 of the insert body. According to the invention, however, as will hereinafter be further discussed, the internal cross-sectional dimension of the circular cylindrical side wall segment 55 is such that a predetermined elastic interference fit is formed between the inner surface 57 of the wall segment 55 and the coated cylindrical outer surface 35 of the insert body 21 when the cap 14 is press fit onto the insert 12.

The cap 14 is fabricated of stainless steel sheet with a nominal thickness of 0.018 to 0.020 inches. The inside diameter (ID) of the cylindrical wall segment 55 is preferably 0.910 inches. When the cap 14 is pressed onto the insert 12, the cylindrical wall segment 55 undergoes both plastic and elastic deformation. The portion of deformation that is plastic serves to allow a reasonable manufacturing tolerance for both components. The elastic deformation results in tensile hoop stresses in the cap 14 and constitutes the mechanism by which the cap 14 is retained on the insert 12. The resulting interference fit is approximately 0.0025 inches around the interfering circular cylindrical surfaces as a result of elastic deformation, but can vary with changes in cap wall thickness or mechanical properties of the cap material.

FIG. 7 illustrates the assembly of a nut insert 12 into a cap 14 in a simple mechanical press P. The press P comprises a fixed die D1 in which the cap 14 is seated. A movable die D2 receives the insert 12 and drives it downwardly onto the cap 14 under the influence of pressure exerted in a conventional manner by the mechanical press P. The fixed die D1 receives the cap 14 in a well W. The well W is dimensioned to permit the radial expansion of the cylindrical side wall segment 55 which takes place in the cap 14 as the insert 12 is press fit into the cap 14.

Figure 8:
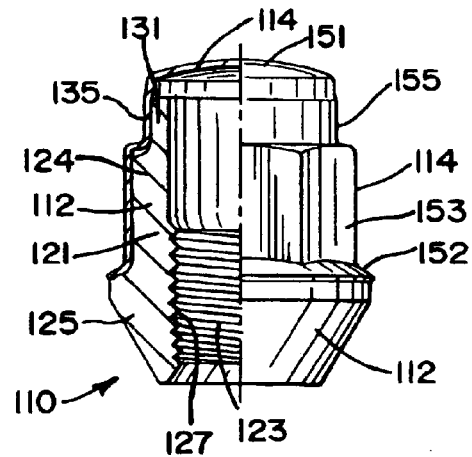
FIG. 8 is a side view, partially in elevation and partially in section, of a second embodiment of the capped invention.
Figure 9:
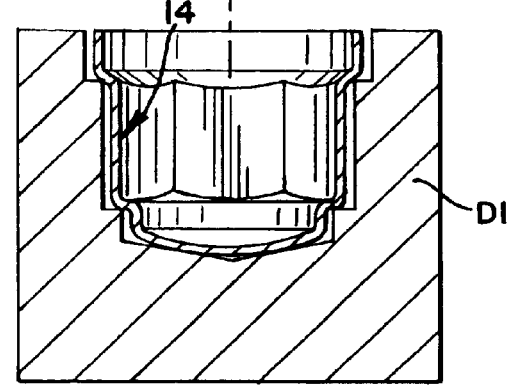
FIG. 9 is a top plan view of the capped wheel nut assembly seen in FIG. 8.

Referring now to FIGS. 8 and 9, a decorative capped wheel nut assembly comprising a second embodiment of the invention is seen generally at 110. The assembly 110 includes a nut insert 112 and a decorative cap 114 fastened together according to the present invention.

The nut insert 112 comprises a body 121 having a cylindrical bore 123 extending axially through it from a cylindrical section 131 on one end to a frusto-conical base 125 on the other. The base 125 is adapted to seat in a wheel rim aperture (not shown). The bore 123 is internally threaded at 127. The insert 112 is coated in a manner previously discussed.

Between the conical base 125 and the cylindrical section 131, there is a hex-shaped section 124. The hex-shaped section 124 corresponds to the hex section 24 in the insert body 21 of the assembly 10.

The axially outer, or end cylindrical section 131, has a coated cylindrical outer surface 135 with an OD of 0.660 inches. The surface 135 has an axial length of 0.190 inches.

As seen in FIG. 8 the cap 114, which is again formed from stainless steel sheet, comprises four axially aligned segments; a dome shaped end wall segment 151, a cylindrical side wall segment 155, a hex-shaped side wall segment 153 and a frusto-conical lip 152. The configuration and internal cross-sectional dimensions of the hex-shaped side wall segment 153 are such that it slips easily over the coated hex-shaped section 124 in the insert body 121.

The ID of the cylindrical wall segment 155 is 0.640 inches. When the cap 114 is pressed onto the insert 112, the cylindrical wall segment 155 undergoes both plastic and elastic deformation in the manner hereinbefore discussed with relation to the cap 14. The elastic deformation constitutes the mechanism by which the cap 114 is retained on the insert 112. The resulting interference fit is approximately 0.0025, again varying with changes in cap wall thickness or mechanical properties of the cap material.

Figure 10:
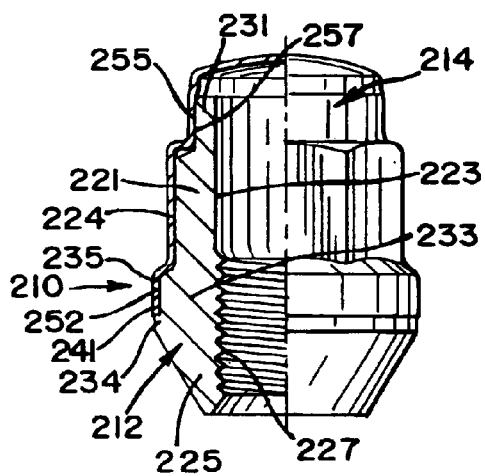
FIG. 10 is a split elevational/sectional view, similar to FIG. 8, of a third embodiment of the capped wheel nut assembly invention.
Figure 11:
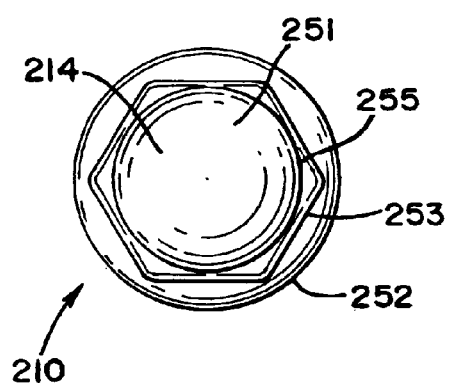
FIG. 11 is a top plan view of the capped wheel nut assembly seen in FIG. 10.

Referring now to FIGS. 10 and 11, a decorative capped wheel nut assembly comprising a third embodiment of the invention is seen generally at 210. The assembly 210 includes a nut insert 212 and a decorative cap 214 fastened together according to the invention.

The nut insert 212 comprises a body 221 having a cylindrical bore 223 extending axially through it from a cylindrical section 231 on one end to a frusto-conical base 225 on the other. The base 225 is adapted to seat in a wheel rim aperture (not shown). The bore 223 is internally threaded at 227. Like the inserts 12 and 112, the insert 212 is coated.

Between the conical base 225 and the end cylindrical section 231 there is a hex-shaped section 224. The hex-shaped section 224 corresponds to the section 24 in the insert body 21 of the insert 12.

Between the hex-shaped section 224 and the frusto-conical base 225, the insert body 221 has two cylindrical body sections 233 and 234. The axially outer cylindrical section 233 of the two has a coated cylindrical outer surface 235 with an outside diameter (OD) of 0.930 inches. The surface 235 has an axial length of 0.130 inches. A radially extending shoulder 241 is formed between the two cylindrical surfaces 233 and 234.

The end cylindrical section 231 has a coated cylindrical outer surface 236 with an OD of 0.660 inches. The surface 236 has an axial length of 0.190 inches.

As seen in FIG. 11, the cap 214, again formed of stainless steel sheet, comprises four axially aligned segments; a dome shaped end wall segment 251, an end circular cylindrical side wall segment 255, a hex-shaped side wall segment 253 and a circular cylindrical side wall segment 252. The configuration and internal cross-sectional dimensions of the hex-shaped side wall segment 253 are such that it will slip freely over the coated hex-shaped section 224 in the insert body 221.

The ID of the cylindrical wall segment 255 is 0.640 inches. When the cap 214 is pressed onto the insert 212, the cylindrical wall segment 255 undergoes the aforedescribed plastic and elastic deformation as it is forced over the coated cylindrical surface 236. The resulting interference fit is again approximately 0.0025.

The ID of the cylindrical side-wall segment 252 is 0.910 inches. As such, an interference fit of 0.0025 inches is effected at the same time between the side-wall segment 252 and the coated outer surface 235 of the end cylindrical section 231.

Figure 12:
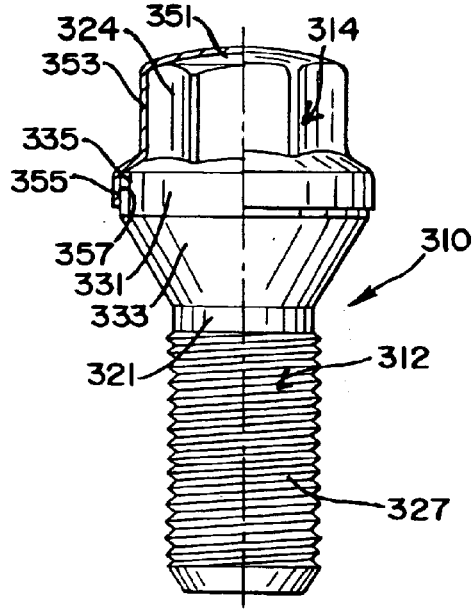
FIG. 12 is a split elevational/sectional view, similar to FIG. 8, of a fourth embodiment of the invention, a decorative capped wheel bolt assembly.
Figure 13:
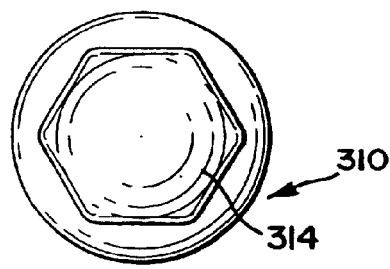
FIG. 13 is a top plan view of the capped wheel bolt assembly seen in FIG. 12.

In FIGS. 12–15 the invention is seen in the context of a wheel bolt rather than a wheel nut. Referring specifically to FIGS. 12 and 13, a decorative capped wheel bolt assembly comprising a fourth embodiment of the invention is seen generally at 310. The assembly 310 includes a bolt insert 312 and a decorative cap 314.

The bolt insert 312 comprises a bolt body 321 fabricated of carbon steel in a conventional manner. The body 321 includes a hex-shaped section 324 at one end and an externally threaded base 327 at the opposite end. The insert 312 is coated in a manner previously discussed.

Between the hex-section 324 and the threaded base 327, a circular cylindrical section 331 and a frusto-conical section 333 are formed. The circular cylindrical section 331 has a coated cylindrical outer surface 335. The OD of surface 335 is 0.895 inches. The surface 335 has an axial length of 0.165 inches.

The frusto-conical section 333 is adapted to seat in a wheel rim aperture (not shown) to fasten the wheel rim to a vehicle wheel. The threaded base 327 of the insert 312 threads into the wheel hub in a well known manner.

The cap 314, again formed from stainless steel sheet, comprises three axially aligned segments, a dome shaped end wall segment 351, a hex-shaped side wall segment 353 and a cylindrical side wall segment 355. The configuration and internal cross-sectional dimensions of the hex-shaped side wall segment 353 are such that it slips easily over the coated hex-shaped section 324 in the insert body 321.

The ID of the cylindrical wall segment 355 is 0.875 inches. When the cap 314 is pressed onto the insert 312, the cylindrical wall segment 355 undergoes the aforedescribed plastic and elastic deformation as it is forced over-the coated surface 335 on the bolt body 321. The resulting interference fit is again approximately 0.0025 inches.

Figure 14:
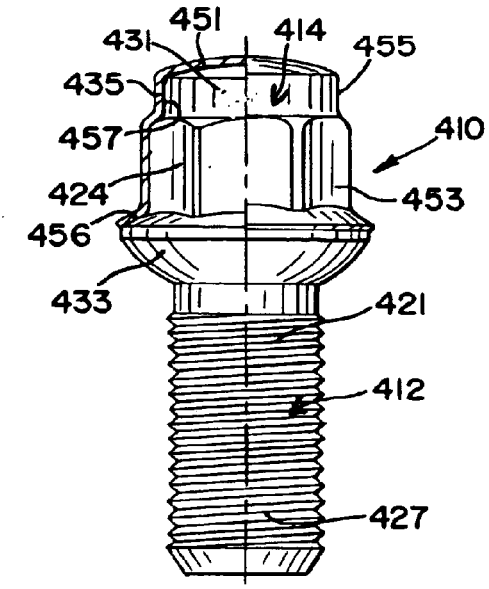
FIG. 14 is a split elevational/sectional view, similar to FIG. 8, of a fifth embodiment of the invention, another decorative capped wheel bolt assembly.
Figure 15:
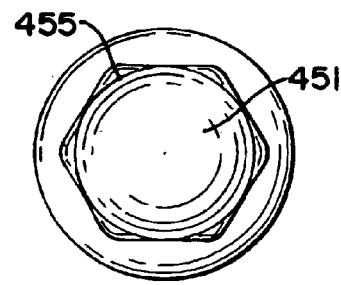
FIG. 15 is a top plan view of the capped wheel bolt assembly seen in FIG. 14.

Referring now to FIGS. 14 and 15, a decorative capped wheel bolt assembly comprising a fifth embodiment of the invention is seen generally at 410. The assembly 410 also includes a bolt insert 412 and a decorative cap 414.

The bolt insert 412 comprises a bolt body 421 fabricated of carbon steel in a conventional manner. The body 421 includes a hex-shaped section 424 near one end and an externally threaded base 427 at the opposite end. The insert 412 is coated in a manner previously discussed.

Axially outwardly of the hex-section 424, the insert 412 includes a circular cylindrical section 431. The circular cylindrical section 431 has a coated cylindrical outer surface 435. The OD of surface 435 is 0.615 inches. The surface 435 has an axial length of 0.150 inches.

The insert 412 also has a spherical section 433 adapted to seat in a conventional manner in a wheel rim aperture (not shown) to fasten the wheel rim to a vehicle wheel. The threaded base 427 of the insert 412 threads into the wheel in a well known manner.

The cap 414, again formed from stainless steel sheet, comprises three axially aligned segments; a dome shaped end wall segment 451, a cylindrical side wall segment 455, a hex-shaped side wall segment 453 and a flared lip 456. The configuration and internal cross-sectional dimensions of the hex-shaped side wall segment 453 are such that it slips easily over the coated hex-shaped section 424 in the insert body 421.

The ID of the cylindrical wall segment 455 is 0.595 inches. When the insert 412 is pressed into the cap 414, the cylindrical wall segment 455 undergoes the aforedescribed plastic and elastic deformation. As it is forced over the coated cylindrical surface 435 on the bolt body 421, an interference fit of approximately 0.0025 inches is effected around the coated surface 435.

Figure 16:
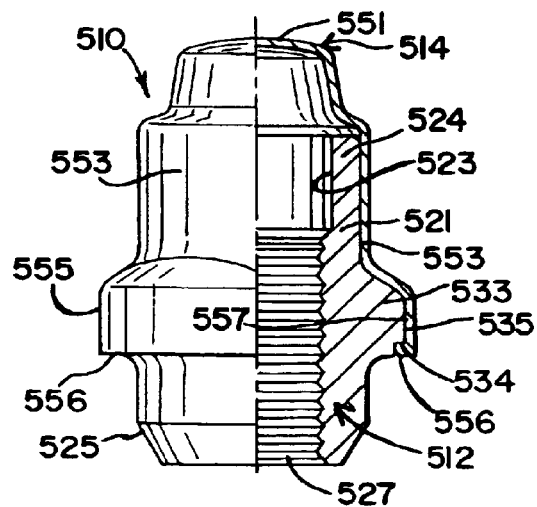
FIG. 16 is a split elevational/sectional view, similar to FIG. 8, of a sixth embodiment of the invention, another capped wheel nut assembly.
Figure 17:
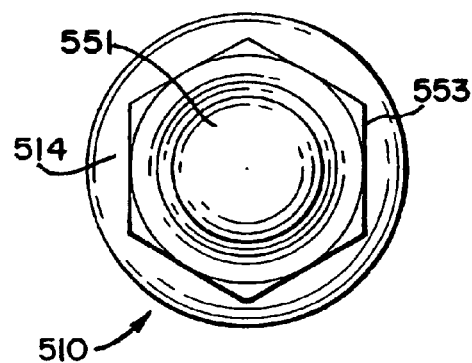
FIG. 17 is a top plan view of the capped wheel nut assembly seen in FIG. 16.

FIGS. 16 and 17 illustrate yet a sixth embodiment of a capped wheel nut assembly embodying features of the invention at 510. The assembly 510 includes a nut insert 512 and a decorative cap 514.

The nut insert 512 comprises a body 521 having a cylindrical bore 523 extending axially through it from a hex-shaped section 524 on one end to a frusto-conical base 525 on the other. The base 525 is adapted to seat in a wheel rim aperture (not shown). The bore 523 is internally threaded at 527. Like the inserts 12 and 112, the insert 512 is coated.

Between the hex-shaped head 524 and the frusto-conical base 525, the insert body 521 has a body section 533. The body section 533 of the illustrated insert body 521 has a coated cylindrical outer surface 535 with an OD of 1.160 inches and an axial length of 0.130 inches. Below the cylindrical body section surface 535, and above the frusto-conical base 525, there is an undercut 534.

The cap 514 comprises three axially aligned wall segments; a dome-shaped end wall segment 551, a hex cross-section side wall segment 553, a circular cylindrical side wall segment 555 and a crimp section 556. The configuration and internal cross-sectional dimensions of the hex-shaped side wall segment 553 are such that it slips easily over the coated, hex-shaped section 524 of the insert body (before the inward crimp section 556 is formed). The internal cross-sectional dimension of the circular cylindrical side wall segment 555 is such that a predetermined interference fit is formed between the inner surface 557 of the wall segment 555 and the coated cylindrical outer surface 535 of the insert body 521 when the cap 514 is press fit onto the insert 512.

The cap 514 is fabricated of stainless steel sheet with a nominal thickness of 0.018 to 0.020 inches. The inside diameter (ID) of the cylindrical wall segment 555 is preferably 1.140 inches. The cap 514 is pressed onto the insert 512 and the cylindrical wall segment 555 undergoes plastic and elastic deformation. The resulting interference fit is approximately 0.0025.

In this embodiment of the invention, the crimp section 556 is formed inwardly after the insert 512 is press fit into the cap 514 in the aforedescribed manner. Crimping may be accomplished as a continuation of the press-fit operation. The crimp section 556 is crimped into engagement with the undercut 534 on the insert body 521. The crimp feature is offered as an option where the assembly 510 may be subject to extreme wrenching abuse, and assures that it will remain intact under such conditions. It also provides a pleasing decorative appearance to the assembly. The interference fit and the crimp then both serve to hold the cap 514 securely on the insert 512 with the interference fit serving the further function of blocking the entry of moisture at the juncture of surfaces 535 and 557.

Figure 18:
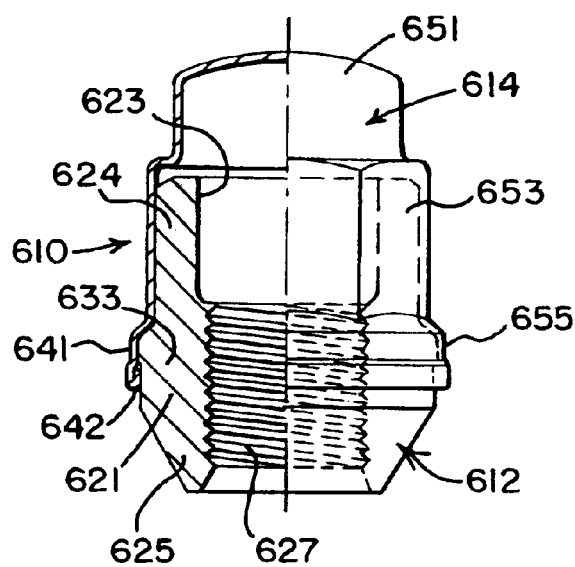
FIG. 18 is a split elevational/sectional view, similar to FIG. 8, of a seventh embodiment of the invention, yet another capped wheel nut assembly.
Figure 19:
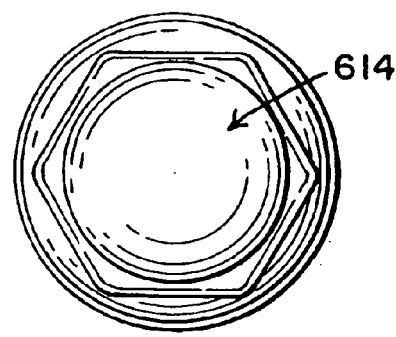
FIG. 19 is a top plan view of the capped wheel nut assembly seen in FIG. 18.
Figure 20:
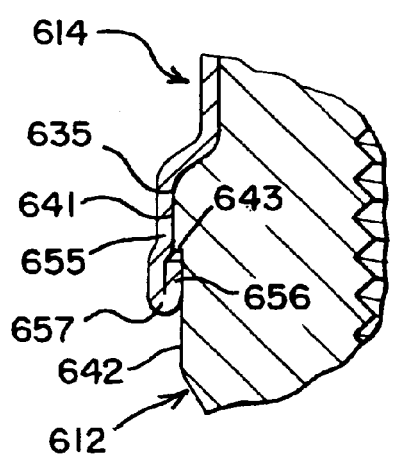
FIG. 20 is an enlarged portion of the assembly seen in FIG. 18.

FIGS. 18–20 illustrate a seventh embodiment of a capped wheel nut assembly embodying features of the invention at 610. The assembly 610 includes a nut insert 612 and a decorative cap 614.

The nut insert 612 comprises a body 621 having a cylindrical bore 623 extending axially through it from a hex-shaped section 624 on one end to a frusto-conical base 625 on the other. The base 625 is adapted to seat in a wheel rim aperture (not shown). The bore 623 is internally threaded at 627. Like the inserts 12 and 112, the insert 612 is coated.

Between the hex-shaped head 624 and the frusto-conical base 625, the insert body 621 has a body section 633. As best seen in FIG. 20, the body section 633 of the illustrated insert body 621 has a coated cylindrical surface 635 adjacent the base 625 which has an axial length of 0.180 inches. The coated cylindrical surface 635 includes a first cylindrical surface 641 having an OD of 0.910 inches and an axial length of 0.070 inches and a second cylindrical surface 642 having an OD of 0.890 inches and an axial length of 0.110 inches. An annular shoulder 643 having a width of 0.010 inches is, thus, formed between the first and second surfaces 641 and 642.

The cap 614 comprises three axially aligned wall segments; a dome-shaped end wall segment 651, a hex cross-section side wall segment 653 and a generally circular cylindrical side wall segment 655. The configuration and internal cross-sectional dimensions of the hex-shaped side wall segment 653 are such that it slips easily over the coated, hex-shaped section 624 of the insert body.

The circular cylindrical side wall segment 655 includes a lip 656 folded back inside the wall segment. As seen in FIG. 20, the lip 656 doubles the wall segment 655 thickness at its outer end, as seen at 657. Coextensive with the lip 656, the wall segment 655 is also formed slightly outwardly so that the double thickness portion 657 of it is effectively centered under the segment 655.

The cap 614 is fabricated of stainless steel sheet with a nominal thickness of 0.018 to 0.020 inches. The inside diameter (ID) of the cylindrical wall segment 655 not covered by the lip 656 is preferably 0.890 inches. The cap 614 is pressed onto the insert 612 and the cylindrical wall segment 655 undergoes plastic and elastic deformation. The resulting interference fit between the first cylindrical surface 641 and wall segment 655 is approximately 0.0025 inches.

In effect, both the wall segment 655 not covered by the lip 656 and the double thickness portion 657 of the wall segment 655, 656 including the lip, stretch radially outwardly as the cap 614 is pressed on to the insert 612. When the lip 656 passes the shoulder 643, it snaps radially inwardly due to the elastic component of the deformation, effectively locking the cap on the nut insert.

Figure 21:
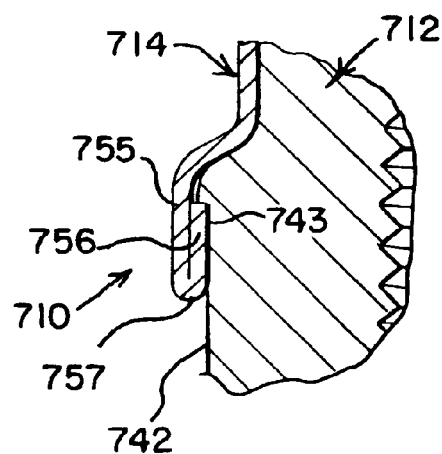
FIG. 21 is an enlarged portion of an assembly similar to that of FIG. 20, showing a variation of the seventh embodiment assembly.

Referring now to FIG. 21, a variation of the seventh embodiment capped wheel nut assembly 610 is seen at 710. The assembly 710 is very similar in construction and operation to the assembly 610, so only differences are described. Reference numerals which correspond to those of the assembly plus 100 digits are employed.

In the assembly 710, the circular cylindrical wall segment 755 of the cap 714 has an axially longer cylindrical lip 756, and the shoulder 743 is located accordingly. No offset is formed in the wall segment 755 so the double thickness portion 757 is not centered under the remainder of the wall segment 755.

The cylindrical surface 742 adjacent the shoulder 743 has an outside diameter of 0.890 inches. The inside diameter of the cylindrical lip 756 is 0.870 inches. When the cap 714 is press fit onto the insert 714, the wall segment 755 and lip 756 undergo plastic and elastic deformation. An interference fit between the lip 756 and the surface 742 is approximately 0.0025 inches.

It should be pointed out at this point that the various inserts described might be plated first and then coated. They might also be plated in a conventional manner and not coated. The invention contemplates employing any of these approaches to protect a carbon steel insert from the elements. It should also be understood that although only the third embodiment assembly 210 (FIGS. 10 and 11) illustrates using separate interference fits at two axially spaced, mating cylindrical surfaces, the invention contemplates the use of either one or two sets of mating cylindrical surfaces in any embodiment, as a matter of choice.

While preferred embodiments of the invention have been described, it should also be understood that the invention is not so limited and modifications may be made without departing from the invention. The scope of the invention is defined by the appended claims, and all devices that come within the meaning of the claims, either literally or by equivalence, are intended to be embraced therein.

What is claimed is:

1. A decorative cap and a wheel fastener for a vehicle wheel, comprising:

a) a fastener insert body having threads formed thereon encircling the axis of said body;

b) said body including one section having an external surface with a polygonal cross-section encircling said axis;

c) said body including another section having an external surface with a circular cylindrical cross-section encircling said axis; and d) a cap including one wall segment having an internal surface with a polygonal cross-section;

e) said cap including another wall segment having an internal surface with a circular cylindrical cross-section;

f) said cap being formed of sheet material which is radially deformable both plastically and elastically;

g) said circular cylindrical cross-section internal surface of said cap having a predetermined inside diameter;

h) said circular cylindrical cross-section external surface of said insert body having a predetermined outside diameter;

i) said predetermined inside diameter being sufficiently less than said predetermined outside diameter whereby said cap is adapted to fit onto said insert such that said cap is plastically and elastically deformed with said elastic deformation forming at least a 0.002 inches interference fit around the interfering cylindrical surfaces to provide a tensile hoop stress to hold the cap on the body.

2. The cap and fastener of claim 1 further characterized in that:

a) said external surfaces of said insert body are coated; and b) said coating is approximately 0.001 inches thick.

3. The cap and fastener of claim 2 further characterized in that:

a) said coating is chromium free.

4. The cap and fastener of claim 1 further characterized in that:

a) the diameter of said internal cylindrical surface in said undeformed cap is 0.010 to 0.030 less than the diameter of said external cylindrical surface on said insert and said elastic deformation of said other wall segment of said cap is adapted to form at least 0.0025 inches interference fit around the interfering cylindrical surfaces.

5. The cap and fastener of claim 1 further characterized in that:

a) said elastic of aid other wall segment is adapted to form between 0.002 and 0.006 inches interference fit around the interfering cylindrical surfaces.

6. The cap and fastener of claim 1 further characterized in that:

a) said internal polygonal surface is adapted to be seated over said external polygonal surface on said insert in a non-interference fit relationship.

7. The cap and fastener of claim 1 further characterized in that:

a) said insert body includes another section having an external surface with a circular cylindrical cross-section, said other body section being separate from said one body section; and b) said cap includes another wall segment having an internal surface with a circular cylindrical cross-section;

c) an elastic, interference fit also adapted to being established between said other external and internal circular cylindrical surfaces.

8. The cap and fastener of claim 1 further characterized in that:

a) said cap including a crimp segment; and b) said insert body including an undercut which is adapted to be engaged by said crimp segment.

9. The cap and fastener assembly of claim 1 further characterized in that:

a) said one circular cylindrical surface on said insert body has an outside diameter of about 0.930 inches.

10. The cap and fastener assembly of claim 1 further characterized in that:

a) a shoulder is formed in said circular cylindrical surface on said insert;

b) said cap having an annular free edge which is adapted to extend radially inwardly and seat under said shoulder.

11. The cap and fastener of claim 1 further characterized in that:

a) said external surfaces are coated with another material to a thickness of approximately 0.001 inches.

12. The cap and fastener of claim 11 further characterized in that:

a) said coating material is chromium free.

13. The cap and fastener of claims 1, 11 and 12 further characterized in that:

a) said external and internal circular cylindrical cross-section surfaces are free of adhesive material.

14. The decorative cap and wheel fastener of claim 1, 7 or 12 further characterized in that:

a) said cap is formed of stainless steel sheet.

15. The cap and fastener of claim 1 further characterized in that:

a) said cap includes a free edge on said one wall segment which is folded back inside said one wall segment; and b) said insert includes a shoulder under which said free edge is adapted to be seated in locking relationship.

* * * * *

UNITED STATES PATENT AND TRADEMARK OFFICE
CERTIFICATE OF CORRECTION

PATENT NO.         : 6,866,457 B2                                      Page 1 of 1
APPLICATION NO. : 10/303564
DATED              : March 15, 2005
INVENTOR(S)        : Larry J. Wilson It is certified that error appears in the above-identified patent and that said Letters Patent is hereby corrected as shown below:

<u>On the Title Page</u>

In column 1, line 2, under "U.S. PATENT DOCUMENTS", delete "Heyman" and substitute --Rosenberg-- in its place.

In column 2, line 7, under "FOREIGN PATENT DOCUMENTS", delete line in its entirety.

<u>In the Claims</u>

Column 9, in claim 5, line 35, after "said elastic of" delete "aid" and substitute --said-- in its place.

Signed and Sealed this

Thirtieth Day of October, 2007

JON W. DUDAS
*Director of the United States Patent and Trademark Office*